United States Patent
Liu et al.

(10) Patent No.: US 10,196,035 B2
(45) Date of Patent: Feb. 5, 2019

(54) SAFE DRIVING METHOD, DEVICE AND SYSTEM FOR VEHICLE

(71) Applicant: BOE TECHNOLOGY GROUP CO., LTD., Beijing (CN)

(72) Inventors: Deming Liu, Beijing (CN); Jiantao Liu, Beijing (CN)

(73) Assignee: BOE TECHNOLOGY GROUP CO., LTD. (CN)

(*) Notice: Subject to any disclaimer, the term of this patent is extended or adjusted under 35 U.S.C. 154(b) by 93 days.

(21) Appl. No.: 15/303,460

(22) PCT Filed: Nov. 6, 2015

(86) PCT No.: PCT/CN2015/093941
§ 371 (c)(1),
(2) Date: Oct. 11, 2016

(87) PCT Pub. No.: WO2016/188040
PCT Pub. Date: Dec. 1, 2016

(65) Prior Publication Data
US 2017/0144628 A1 May 25, 2017

(30) Foreign Application Priority Data
May 28, 2015 (CN) .......................... 2015 1 0284648

(51) Int. Cl.
*B60R 25/08* (2006.01)
*B60W 40/08* (2012.01)
(Continued)

(52) U.S. Cl.
CPC .............. *B60R 25/08* (2013.01); *B60R 25/33* (2013.01); *B60T 7/12* (2013.01); *B60T 7/18* (2013.01);
(Continued)

(58) Field of Classification Search
None
See application file for complete search history.

(56) References Cited

U.S. PATENT DOCUMENTS

| 5,900,814 A | 5/1999 | Stern |
| 2005/0075764 A1 | 4/2005 | Horst et al. |

(Continued)

FOREIGN PATENT DOCUMENTS

| CN | 1202434 | 12/1998 |
| CN | 2349075 | 11/1999 |

(Continued)

OTHER PUBLICATIONS

Written Opinion and International Search Report for PCT/CN2015/093941, English Translation of Written Opinion Attached to Original Document, Completed by the Chinese Patent Office, Dated Feb. 2, 2016, All together 14 Pages.

(Continued)

*Primary Examiner* — Mussa A Shaawat
*Assistant Examiner* — Kyung J Kim
(74) *Attorney, Agent, or Firm* — Brooks Kushman P.C.

(57) ABSTRACT

The present disclosure provides a safe driving method, a safe driving device and a safe driving system, for a vehicle. The safe driving device includes an information processor, and a brake controller connected to the information processor. The information processor is configured to acquire vehicle information and information about a driving license of a driver, and determine, in accordance with the vehicle information and the information about the driving license of the driver, whether or not the driver meets a requirement for driving the vehicle. The information processor is further configured to, in the case that the driver does not meet the requirement for driving the vehicle, control the brake controller to brake the vehicle.

16 Claims, 3 Drawing Sheets

(51) Int. Cl.
*B60T 7/12* (2006.01)
*B60R 25/33* (2013.01)
*B60T 7/18* (2006.01)

(52) U.S. Cl.
CPC .......... *B60W 40/08* (2013.01); *B60T 2220/02* (2013.01); *B60W 2040/0809* (2013.01); *B60W 2040/0836* (2013.01); *B60W 2540/24* (2013.01); *B60W 2540/28* (2013.01); *B60W 2710/18* (2013.01)

(56) References Cited

U.S. PATENT DOCUMENTS

2012/0325572 A1* 12/2012 Morgese ................. B60R 22/48
180/268
2015/0025731 A1* 1/2015 Uehara .................... G05D 1/00
701/23

FOREIGN PATENT DOCUMENTS

| CN | 2393756 | 8/2000 |
|---|---|---|
| CN | 1830708 | 9/2006 |
| CN | 101168360 | 4/2008 |
| CN | 101628568 | 1/2010 |
| CN | 102259636 | 11/2011 |

OTHER PUBLICATIONS

Chinese Office Action for Chinese Application No. 20151028648.0, English Translation attached to original document, Completed by the Chinese Patent Office, Dated Aug. 2, 2016, All together 17 Pages.

Third Office Action for Chinese Application No. 201510284648.0, dated Jun. 26, 2017, 10 Pages.

Chinese Second Office Action for Chinese Application No. 201510284648.0, dated Jan. 4, 2017, 11 Pages.

* cited by examiner

SAFE DRIVING METHOD, DEVICE AND SYSTEM FOR VEHICLE

CROSS-REFERENCE TO RELATED APPLICATIONS

This application is the U.S. national phase of PCT Application No. PCT/CN2015/093941 filed on Nov. 6, 2015, which claims priority to Chinese Patent Application No. 201510284648.0 filed on May 28, 2015, the disclosures of which are incorporated in their entirety by reference herein.

TECHNICAL FIELD

The present disclosure relates to the field of vehicle safety technology, in particular to a safe driving method, a safe driving device and a safe driving system for a vehicle.

BACKGROUND

Traffic accidents refer to an incident in which a vehicle causes, when running on road, personal injury or death or property losses due to an error or unexpected incident. Most of the traffic accidents are caused by non-specific persons who violate the traffic control rules. In recent years, the traffic accidents caused by drivers without licenses are still common. In the case that a driver drives a vehicle without any license, it principally includes that the driver does not have a driving license, or the driver illegally obtains the driving license without examination, or the driver's driving license has been cancelled or revoked.

Currently, the driving actions without licenses can merely be investigated and dealt with by traffic policemen, and it is very difficult to prohibit the driving actions without licenses.

SUMMARY

An object of the present disclosure is to provide a safe driving method, a safe driving device and a safe driving system for a vehicle, so as to identify a driver and prevent the driver without a driving license from driving the vehicle, thereby to prevent the traffic accident caused by the driver without the driving license.

In one aspect, the present disclosure provides in some embodiments a safe driving device for a vehicle, including an information processor, and a brake controller connected to the information processor. The information processor is configured to acquire vehicle information and information about a driving license of a driver, and determine, in accordance with the vehicle information and the information about the driving license of the driver, whether or not the driver meets a requirement for driving the vehicle. The information processor is further configured to, in the case that the driver does not meet the requirement for driving the vehicle, control the brake controller to brake the vehicle.

In another aspect, the present disclosure provides in some embodiments a safe driving method for a vehicle, including steps of: acquiring vehicle information, the vehicle information including a vehicle type; acquiring information about a driving license of a driver; and determining, in accordance with the vehicle information and the information about the driving license of the driver, whether or not the drive meets a requirement for driving the vehicle; and in the case that the driver does not meet the requirement for driving the vehicle, braking the vehicle.

In yet another aspect, the present disclosure provides in some embodiments a safe driving system for a vehicle, including the above-mentioned safe driving device.

According to the safe driving method, safe driving device and safe driving system in the embodiments of the present disclosure, the information about the vehicle type and the information about the driving license of the driver may be acquired and compared, and in the case that the driver does not meet the requirement for driving the vehicle, the vehicle may be braked. As a result, it is able to prevent the driver without a driving license from driving a vehicle or prevent the driver from driving a vehicle having a type different from that specified in the driver's driving license, thereby to prevent the traffic accidents.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
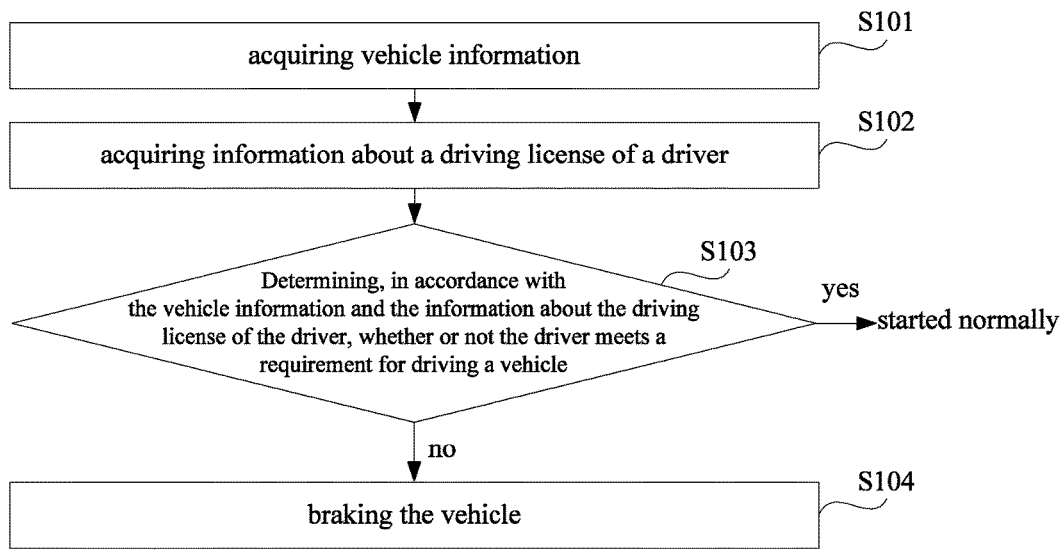
FIG. 1 is a flow chart of a safe driving method for a vehicle according to one embodiment of the present disclosure.

The present disclosure provides in some embodiments a safe driving method for a vehicle. As shown in FIG. 1, the safe driving method includes the following steps.

Step 101: acquiring vehicle information, the vehicle information including a vehicle type. Usually, the vehicle types may include a large bus (A1), a tractor (A2), an urban bus (A3), a medium bus (B1), a large truck (B2), a minicar (C1)

and a small automatic car (C2). To be specific, the vehicle information may be pre-stored in accordance with the vehicle type.

Step 102: acquiring information about a driving license of a driver. To be specific, the information about the driving license includes information about a license number, a permitted vehicle type, a license state, a current score, a date of initial licensing, and an expiry date. The information about the driving license may be inputted manually by the driver himself. Optionally, a physical feature (facial information) may be acquired by a face recognition system, and then the information about the driving license of the driver may be acquired over a network.

Step 103: determining, in accordance with the vehicle information and the information about the driving license of the driver, whether or not the driver meets a requirement for driving the vehicle. To be specific, whether or not the driver meets the requirement for driving the vehicle means that whether or not the driver can drive the vehicle in accordance with the current information about the driving license of the driver. For example, in the case that the driver's driving license has been cancelled or revoked, the driver does not meet the requirement for driving the vehicle. For another example, the driver with a driving license for a vehicle type C2 can merely drive a small automatic car, but cannot drive the other types of vehicles (e.g., a minicar), i.e., the driver with the driving license for a vehicle type C2 does not meet the requirement for driving a minicar.

Step 104: in the case that the driver does not meet the requirement for driving the vehicle, braking the vehicle. To be specific, in the case that the vehicle is initially in a stopping state and the driver doers not meet the requirement for driving the vehicle, the vehicle may be braked, i.e., it may not be started. In the case that the vehicle has been started, an alarm may be sent, so as to instruct the driver to stop the vehicle within a predetermined time period. Otherwise, the vehicle may be automatically braked after the predetermined time period. The predetermined time period may be set in advance and may not be modifiable. Of course, the predetermined time period may be adjusted manually, so as to, for example, prolong the time period for braking the vehicle.

According to the safe driving method in the embodiments of the present disclosure, the information about the vehicle type and the information about the driving license of the driver may be acquired and compared, and in the case that the driver does not meet the requirement for driving the vehicle, the vehicle may be braked. As a result, it is able to prevent the driver without a driving license from driving a vehicle or prevent the driver from driving a vehicle having a type different from that specified in the driver's driving license, thereby to prevent the traffic accidents.

Figure 2:
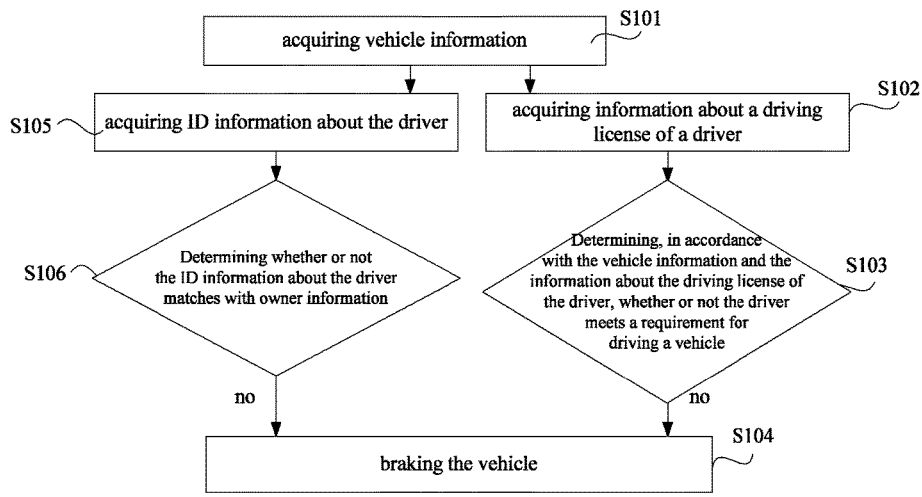
FIG. 2 is another flow chart of the safe driving method according to one embodiment of the present disclosure.

Optionally, the vehicle information further includes owner information, e.g., an owner name and an owner ID. Here, the owner information may be preset or pre-stored information about a plurality of vehicle users. For example, it may include information about the owner's parent who has obtained the driving license, information about the owner's spouse who has obtained the driving license, and information about the owner's child who has obtained the driving license. As shown in FIG. 2, the safe driving method further includes the following steps.

Step 105: acquiring ID information about the driver. To be specific, the ID information of the driver includes information about a driver name and a driver ID.

Step 106: determining whether or not the ID information about the driver matches with the owner information, i.e., determining whether or not the driver is the owner or the pre-stored vehicle user.

Step 104: in the case that the ID information about the driver does not match with the owner information, i.e., the driver is not the owner, braking the vehicle. Step 104 may refer to the contents mentioned above.

Figure 3:
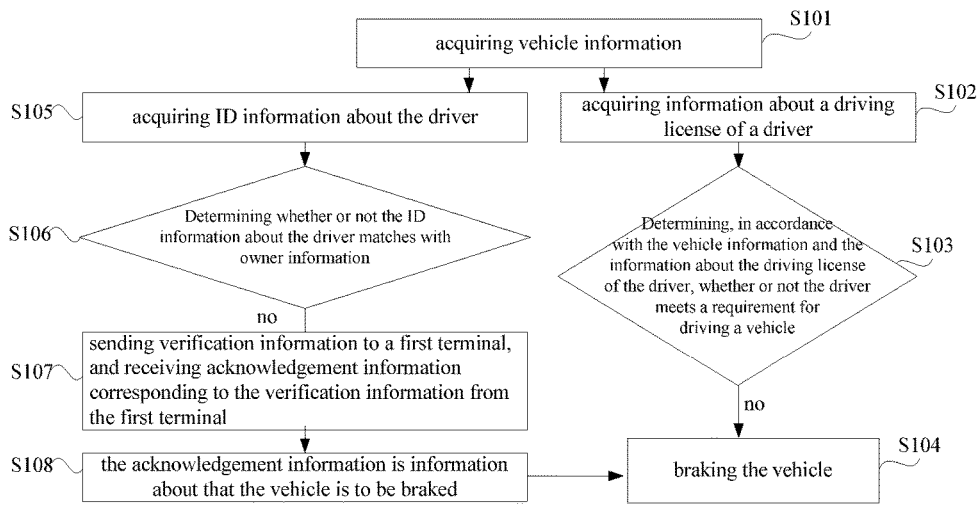
FIG. 3 is yet another flow chart of the safe driving method according to one embodiment of the present disclosure.

Optionally, as shown in FIG. 3, the safe driving method further includes the following steps.

Step 107: in the case that the ID information about the driver does not match with the owner information, sending verification information to a first terminal, and receiving acknowledgement information corresponding to the verification information from the first terminal. The acknowledgement information includes information about whether or not the vehicle is to be braked. To be specific, the first terminal may be a mobile terminal, e.g., an owner's mobile phone. The verification information may be sent and the acknowledgement information may be received within the predetermined time period.

Step 108: in the case that the acknowledgement information is the information about that the vehicle is to be braked, braking the vehicle. For example, in the case that the acknowledgement information is received from the owner, it may determine that the vehicle is lent to another person. In the case that no acknowledgement information is received from the owner, the vehicle may be stolen, and at this time, it may be braked. The braking of the vehicle may refer to the above Step 104.

Figure 4:
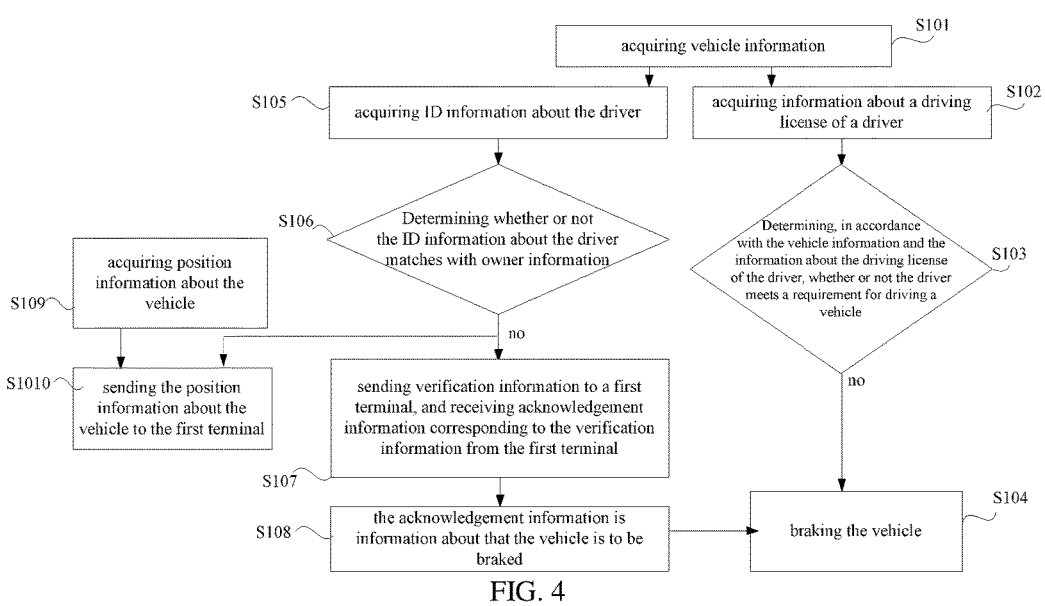
FIG. 4 is still yet another flow chart of the safe driving method according to one embodiment of the present disclosure.

Optionally, as shown in FIG. 4, the safe driving method further includes: Step 109 of acquiring position information about the vehicle; and Step 1010 of, in the case that the ID information about the driver does not match with the owner information, sending the position information about the vehicle to the first terminal, so as to enable the owner to track the vehicle's position.

Optionally, the safe driving method further includes sending running information and the ID information about the driver to a second terminal. The second terminal may be a traffic control system, which may endorse the driver's driving license with certain penalty points in the case of traffic violations.

Optionally, the safe driving method further includes the following steps.

Step 201: detecting an alcohol content of the driver. To be specific, an alcometer may be used to detect the alcohol content of the driver. The alcometer may be an infrared sensor, which may output a laser beam at a stable frequency through a semiconductor laser and then capture an absorption peak of alcohol (with the interference from any other gases being removed) so as to detect the alcohol content of the driver. A detection error may be reduced through adjusting a wavelength of the laser beam. The optical detection method has rapid response and high stability. The alcometer may be mounted on a steering wheel of the vehicle, so as to detect the alcohol content in a contacted manner, thereby to reduce, during the detection in a contactless manner, the detection error caused in the case that a passenger in the vehicle has drunk or the alcohol exists in the air.

Step 202: determining whether or not the alcohol content of the driver exceeds a predetermined value.

Step 203: in the case that the alcohol content of the driver exceeds the predetermined value, braking the vehicle. The braking of the vehicle may refer to the above-mentioned Step 104.

Optionally, in the case that the alcohol content of the driver exceeds the predetermined value, alarm information may also be output, so as to prompt the surrounding vehicles to avoid the vehicle or prompt the traffic policeman. The alarm information may further include the position information about the vehicle. The position information may be sent to another contact, and at this time, the other contact may call the traffic policeman to treat the vehicle and prevent the occurrence of the traffic accident.

The present disclosure further provides in some embodiments a safe driving device for a vehicle. It should be appreciated that, some functional modules of the safe driving device may refer to the contents mentioned above.

Figure 5:
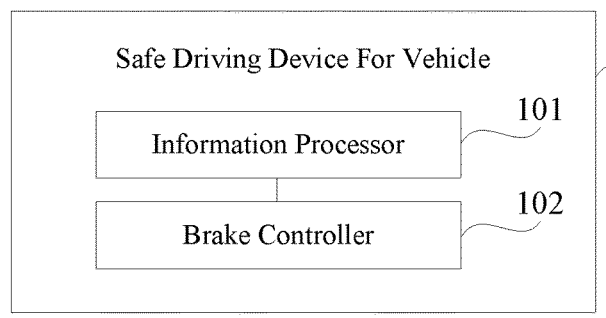
FIG. 5 is a schematic view showing a safe driving device for a vehicle according to one embodiment of the present disclosure.

As shown in FIG. 5, the safe driving device 100 includes a signal processor 101, and a brake controller 102 connected to the signal processor 101. The information processor 101 is configured to acquire the vehicle information and the information about the driving license of the driver, and determine, in accordance with the vehicle information and the information about the driving license of the driver, whether or not the driver meets a requirement for driving the vehicle. To be specific, the vehicle information may be pre-stored in accordance with the vehicle type. The information processor 101 is further configured to, in the case that the driver does not meet the requirement for driving the vehicle, control the brake controller 102 to brake the vehicle.

Figure 6:
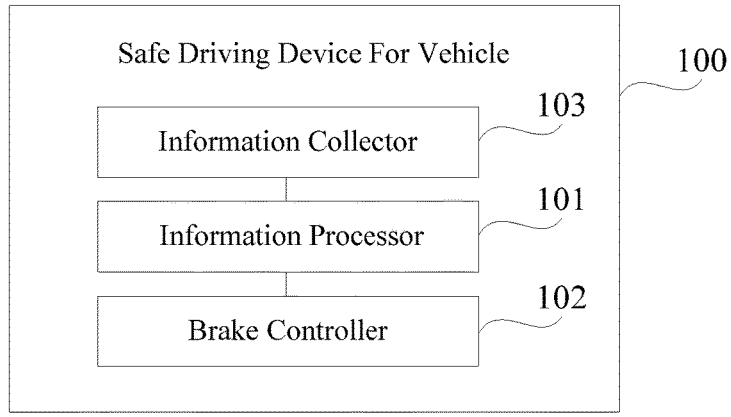
FIG. 6 is another schematic view showing the safe driving device according to one embodiment of the present disclosure.

Optionally, as shown in FIG. 6, the safe driving device 100 further includes an information collector 103 connected to the signal processor 101, and configured to acquire the information about the driving license of the driver and send the information about the driving license to the signal processor 101. The signal processor 101 is specifically configured to acquire the information about the driving license of the driver from the signal collector 103.

Optionally, the information collector 103 is configured to acquire a physical feature of the driver and send the physical feature to the information processor 101. For example, the information collector may be a face recognition system, which is configured to acquire facial information of the driver and send it to the information processor. The information processor 101 is specifically configured to acquire the physical feature of the driver, and acquire the information about the driving license of the driver in accordance with the physical feature. The information processor may acquire the information about the driving license of the driver over a network in accordance with the facial information of the driver.

Optionally, the vehicle information further includes owner information. The information collector is further configured to acquire the ID information about the driver and send the ID information to the information processor. The information processor is further configured to receive the ID information about the driver from the information collector, determine whether or not the ID information about the driver matches with the owner information, and in the case that the ID information about the driver does not match with the owner information, control the brake controller to brake the vehicle.

Optionally, in the case that the information collector is used to collect the physical feature of the driver, the information processor is further configured to acquire the ID information about the driver in accordance with the physical feature, determine whether or not the ID information matches with the owner information, and in the case that the ID information about the driver does not match with the owner information, control the brake controller to brake the vehicle.

Figure 7:
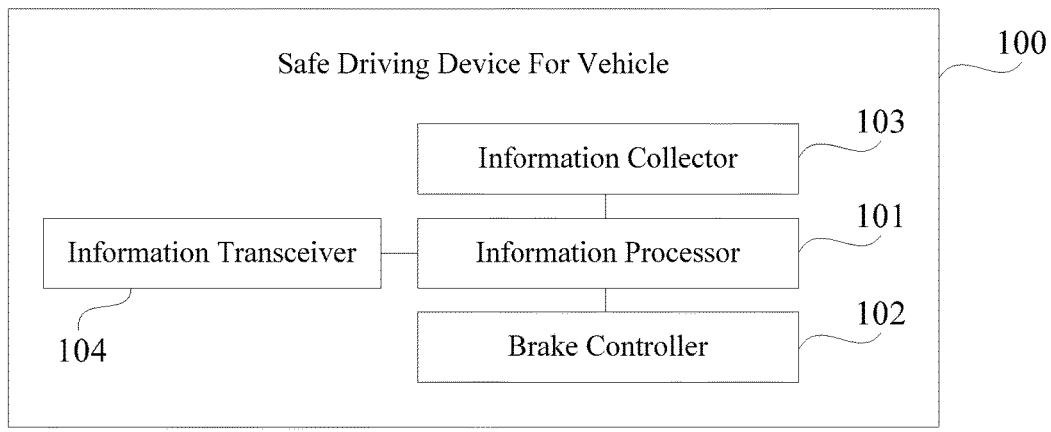
FIG. 7 is yet another schematic view showing the safe driving device according to one embodiment of the present disclosure.

Optionally, as shown in FIG. 7, the safe driving device 100 further includes an information transceiver 104 connected to the information processor 101.

The information processor 101 is further configured to send information about whether or not the ID information matches with the owner information to the information transceiver 104. The information transceiver may also be used to send and receive the other information, which is not particularly defined herein.

The information transceiver 104 is configured to, in the case that the information about the ID information does not match with the owner information has been received from the information processor 101, verification information to the first terminal.

The information transceiver 104 is further configured to receive acknowledgement information corresponding to the verification information from the first terminal, and send the acknowledgement information to the information processor 101. The acknowledgement information includes information about whether or not the vehicle is to be braked.

The information processor 101 is further configured to receive the acknowledge information from the information transceiver 104, and in the case that the acknowledgement information is information about that the vehicle is to be braked, control the brake controller 102 to brake the vehicle.

Figure 8:
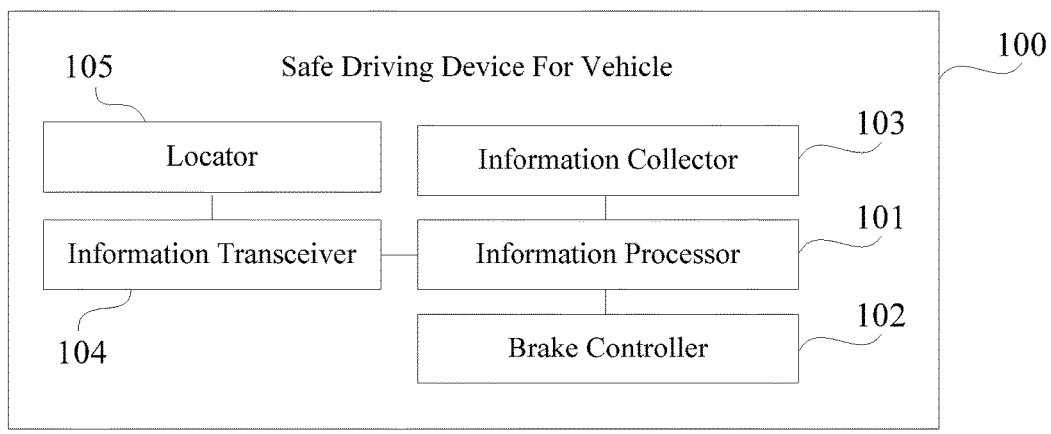
FIG. 8 is still yet another schematic view showing the safe driving device according to one embodiment of the present disclosure.

Optionally, as shown in FIG. 8, the safe driving device 100 further includes a locator 105 connected to the information transceiver 101, and configured to acquire position information about the vehicle and send the position information to the information transceiver 104.

The information transceiver 104 is further configured to receive the position information about the vehicle from the locator 105, and in the case that the ID information about the driver from the information processor 101 does not match with the owner information, send the position information to the first terminal.

In the safe driving device in the embodiments of the present disclosure, the information processor is further configured to send the ID information about the driver to the information transceiver. The information transceiver is further configured to receive the ID information about the driver from the information collector, and in the case that the ID information about the driver from the information processor does not match with the owner information, send the position information about the vehicle and the ID information about the driver to the second terminal. The second terminal may be a traffic control system, which may endorse the driver's driving license with certain penalty points in the case of traffic violations.

Optionally, the safe driving device further includes a display connected to the information processor. The information processor is further configured to send the vehicle information to the display, and the display is configured to receive and display the vehicle information from the information processor. Of course, the display may also display any other information such as information about the driver, which is not particularly defined herein.

Optionally, the safe driving device further includes an alcometer and an alcohol detection processor. The alcometer is connected to the alcohol detection processor, and the alcohol detection processor is connected to the brake controller.

The alcometer is configured to detect an alcohol content of the driver, and send the alcohol content to the alcohol detection processor. The alcohol detection processor is configured to receive the alcohol content of the driver from the alcometer, and determine whether or not the alcohol content of the driver exceeds a predetermined value. The brake controller is further configured to, in the case that the alcohol content of the driver from the alcohol detection processor exceeds the predetermined value, brake the vehicle.

Optionally, in the case that the alcohol content of the driver exceeds the predetermined value, alarm information may also be output, so as to prompt the surrounding vehicles to avoid the vehicle or prompt the traffic policeman. The alarm information may further include the position information about the vehicle. The position information may be sent to another contact, and at this time, the other contact may call the traffic policeman to treat the vehicle and prevent the occurrence of the traffic accident.

The present disclosure provides in some embodiments a safe driving system including the above-mentioned safe driving device.

It should be appreciated that, all of, or parts of, the steps may be implemented through hardware associated with programs or instructions. The programs may be stored in a computer-readable storage medium, and executed so as to perform the above-mentioned steps. The storage medium includes any media capable of storing therein program codes, such as Read Only Memory (ROM), Random Access Memory, magnetic disc or optical disc.

The above are merely the preferred embodiments of the present disclosure. Obviously, a person skilled in the art may make further modifications and improvements without departing from the spirit of the present disclosure, and these modifications and improvements shall also fall within the scope of the present disclosure.

What is claimed is:

1. A safe driving device for a vehicle, comprising an information processor, an information collector connected to the information processor and a brake controller connected to the information processor, wherein
the information processor is configured to acquire vehicle information and information about a driving license of a driver, and determine, in accordance with the vehicle information and the information about the driving license of the driver, whether or not the driver meets a requirement for driving the vehicle; and
the information processor is further configured to, in the case that the driver does not meet the requirement for driving the vehicle, control the brake controller to brake the vehicle;
wherein the vehicle information further comprises owner information; the safe driving device further comprises an information transceiver connected to the information processor, wherein the information processor is further configured to send information about whether or not identity (ID) information about the driver matches with the owner information to the information transceiver; the information transceiver is configured to send verification information to a first terminal in the case that the ID information about the driver from the information processor does not match with the owner information; the information transceiver is further configured to receive acknowledgement information corresponding to the verification information from the first terminal, and send the acknowledgement information to the information process, and the acknowledgement information comprises information about whether or not the vehicle is to be braked; and the information processor is further configured to receive the acknowledgement information, and in the case that the acknowledgement information is information about that the vehicle is to be braked, control the brake controller to control the vehicle,
wherein the information processor is further configured to send the ID information about the driver to the information transceiver; and the information transceiver is further configured to receive the ID information about the driver from the information collector, and in the case that the ID information about the driver from the information processor does not match with the owner information, send position information about the vehicle and the ID information about the driver to a second terminal.

2. The safe driving device according to claim 1, wherein
the information collector is configured to acquire information about the driving license of the driver and send the information about the driving license of the driver to the information processor; and
the information processor is configured to acquire the information about the driving license of the driver from the information collector, or
the information collector is configured to acquire a physical feature of the driver, and send the physical feature of the driver to the information processor; and
the information processor is configured to acquire the physical feature of the driver, and acquire the information about the driving license of the driver in accordance with the physical feature of the driver.

3. The safe driving device according to claim 2, wherein
the information collector is further configured to acquire the ID information about the driver, and send the ID information about the driver to the information processor; and
the information processor is further configured to receive the ID information about the driver from the information collector, determine whether or not the ID information about the driver matches with the owner information in accordance with the ID information about the driver and the owner information, and in the case that the ID information about the driver does not match with the owner information, control the brake controller to brake the vehicle, or
in the case that the information collector is configured to acquire the physical feature of the driver, the information processor is further configured to acquire the ID information about the driver in accordance with the physical feature of the driver, determine whether or not the ID information about the driver matches with the owner information in accordance with the ID information about the driver and the owner information, and in the case that the ID information about the driver does not match with the owner information, control the brake controller to brake the vehicle.

4. The safe driving device according to claim 1, further comprising a locator connected to the information transceiver, wherein
the locator is configured to acquire position information about the vehicle, and send the position information to the information transceiver; and
the information transceiver is further configured to receive the position information about the vehicle from the locator, and in the case that the ID information about the driver from the information processor does not match with the owner information, send the position information about the vehicle to the first terminal.

5. The safe driving device according to claim 1, further comprising a display connected to the information processor, wherein the information processor is further configured to send the vehicle information to the display, and the display is configured to receive and display the vehicle information from the information processor.

6. The safe driving device according to claim 1, further comprising an alcometer and an alcohol detection processor connected to the alcometer, wherein
   the alcohol detection processor is further connected to the brake controller;
   the alcometer is configured to detect an alcohol content of the driver, and send the alcohol content of the driver to the alcohol detection processor;
   the alcohol detection processor is configured to receive the alcohol content of the driver from the alcometer, and determine whether or not the alcohol content of the driver exceeds a predetermined value; and
   the brake controller is further configured to brake the vehicle in the case that the alcohol content of the driver from the alcohol detection processor exceeds the predetermined value.

7. A safe driving method for a vehicle, comprising steps of:
   acquiring vehicle information, the vehicle information including a vehicle type;
   acquiring information about a driving license of a driver;
   determining, in accordance with the vehicle information and the information about the driving license of the driver, whether or not the drive meets a requirement for driving the vehicle; and
   in the case that the driver does not meet the requirement for driving the vehicle, braking the vehicle;
   wherein the vehicle information further comprises owner information, the method further comprises:
   in the case that identity (ID) information about the driver does not match with the owner information, sending verification information to a first terminal, and receiving acknowledgement information corresponding to the verification information from the first terminal, the acknowledgement information comprising information about whether or not the vehicle is to be braked;
   in the case that the acknowledgement information is information about that the vehicle is to be braked, braking the vehicle, and
   sending position information about the vehicle and the ID information about the driver to a second terminal.

8. The safe driving method according to claim 7, wherein the safe driving method further comprises:
   acquiring the ID information about the driver;
   determining whether or not the ID information about the driver matches with the owner information; and
   in the case that the ID information about the driver does not match with the owner information, braking the vehicle.

9. The safe driving method according to claim 7, further comprising:
   acquiring position information about the vehicle; and
   in the case that the ID information about the driver does not match with the owner information, sending the position information about the vehicle to the first terminal.

10. The safe driving method according to claim 7, further comprising:
    detecting an alcohol content of the driver;
    determining whether or not the alcohol content of the driver exceeds a predetermined value; and
    in the case that the alcohol content of the driver exceeds the predetermined value, braking the vehicle.

11. A safe driving system for a vehicle, comprising the safe driving device according to claim 1.

12. The safe driving system according to claim 11, further comprising an information collector connected to the information processor, wherein
    the information collector is configured to acquire information about the driving license of the driver and send the information about the driving license of the driver to the information processor; and
    the information processor is configured to acquire the information about the driving license of the driver from the information collector, or
    the information collector is configured to acquire a physical feature of the driver, and send the physical feature of the driver to the information processor; and
    the information processor is configured to acquire the physical feature of the driver, and acquire the information about the driving license of the driver in accordance with the physical feature of the driver.

13. The safe driving system according to claim 12, wherein the vehicle information further comprises owner information;
    the information collector is further configured to acquire identity (ID) information about the driver, and send the ID information about the driver to the information processor; and
    the information processor is further configured to receive the ID information about the driver from the information collector, determine whether or not the ID information about the driver matches with the owner information in accordance with the ID information about the driver and the owner information, and in the case that the ID information about the driver does not match with the owner information, control the brake controller to brake the vehicle, or
    in the case that the information collector is configured to acquire the physical feature of the driver, the information processor is further configured to acquire the ID information about the driver in accordance with the physical feature of the driver, determine whether or not the ID information about the driver matches with the owner information in accordance with the ID information about the driver and the owner information, and in the case that the ID information about the driver does not match with the owner information, control the brake controller to brake the vehicle.

14. The safe driving system according to claim 13, further comprising an information transceiver connected to the information processor, wherein
    the information processor is further configured to send information about whether or not the ID information about the driver matches with the owner information to the information transceiver;
    the information transceiver is configured to send verification information to a first terminal in the case that the ID information about the driver from the information processor does not match with the owner information;
    the information transceiver is further configured to receive acknowledgement information corresponding to the verification information from the first terminal, and send the acknowledgement information to the information process, and the acknowledgement information comprises information about whether or not the vehicle is to be braked; and
    the information processor is further configured to receive the acknowledgement information, and in the case that the acknowledgement information is information about that the vehicle is to be braked, control the brake controller to control the vehicle.

15. The safe driving system according to claim 14, further comprising a locator connected to the information transceiver, wherein
the locator is configured to acquire position information about the vehicle, and send the position information to the information transceiver; and
the information transceiver is further configured to receive the position information about the vehicle from the locator, and in the case that the ID information about the driver from the information processor does not match with the owner information, send the position information about the vehicle to the first terminal.

16. The safe driving system according to claim 14, wherein
the information processor is further configured to send the ID information about the driver to the information transceiver; and
the information transceiver is further configured to receive the ID information about the driver from the information collector, and in the case that the ID information about the driver from the information processor does not match with the owner information, send the position information about the vehicle and the ID information about the driver to a second terminal.

* * * * *